INVENTORS.
WILLIAM O. BAKER
PAUL D. PRIZLER
By Flam and Flam
ATTORNEYS.

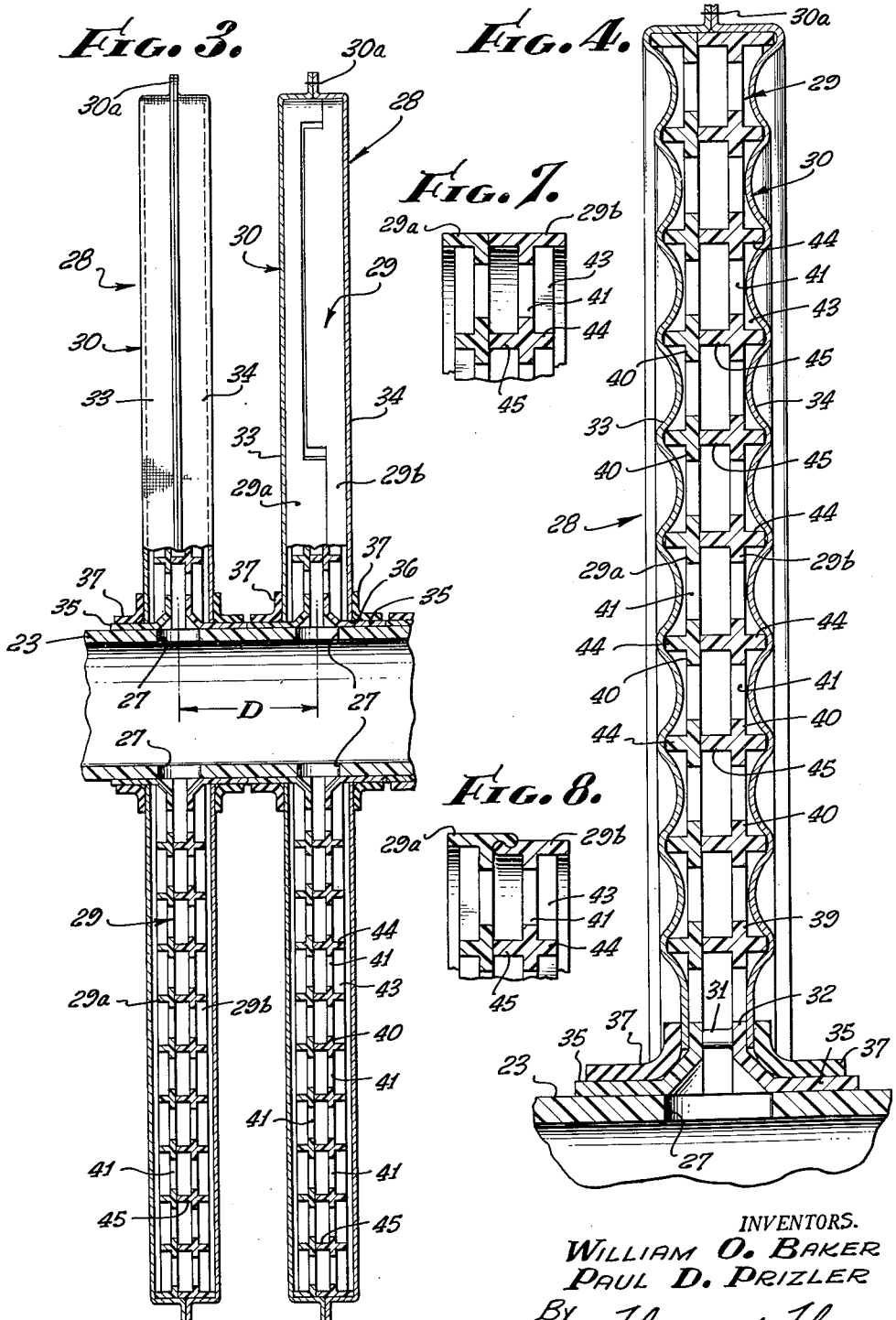

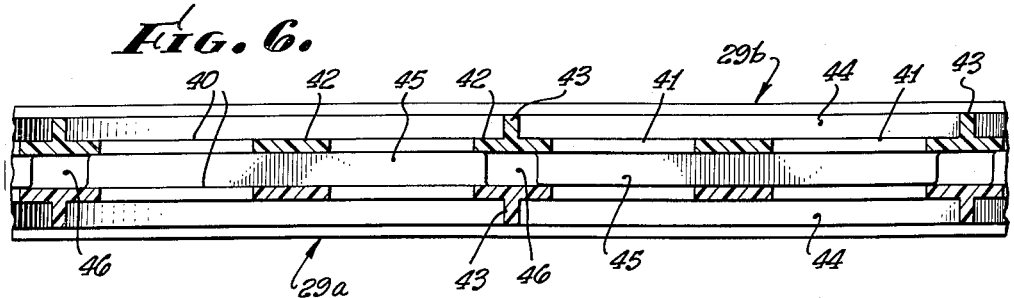

3,019,905
FILTER ELEMENT AND ASSEMBLY
William O. Baker, West Covina, and Paul D. Prizler, Temple City, Calif., assignors to Swimquip, Inc., El Monte, Calif., a corporation of California
Filed Dec. 15, 1959, Ser. No. 859,638
11 Claims. (Cl. 210—486)

This invention relates to a filter structure, and particularly to an improved filter element and assembly utilizing a plurality of such elements.

The filter structure with which this invention is concerned is of the type which may utilize coating material such as diatomaceous earth. Each filter element includes a septum supported upon a core, which in turn is in communication with an effuent line provided in the tank housing the element. The communication is provided by having the core surround a collection tube which forms a feeder for the effuent conduit.

One of the primary objects of this invention is to provide a simplified element of this character that can conveniently be made of essentially two inexpensive parts. Another object of this invention is to provide an improved filter element of this character which compactly provides a substantial effective operating area. An ideal core firmly holds two septum layers in slightly separated relationship with close to no area of contact between the core and the septum. The core should also provide an unimpeded channel for passage of the filtered water to a collection tube or effluent line.

An object of this invention is to provide a core structure that approaches this ideal. To accomplish this purpose, use is made of a core structure comprising in essence a series of concentric rings of narrow dimension for holding the layers apart, and joined together by radiating arms, channels being formed interiorly for passage of filtered water to the center. Another object of this invention is to provide core of this character that can be made of plastic molded by the aid of a simple injection process. The interior channels are conveniently formed by making the core in two parts.

Still another object of this invention is to provide a two-part core structure of this character in which the core parts are identical whereby only a single mold cavity is required.

Another object of this invention is to provide a filter element of this character in which the two molded core parts can be held in assembled relationship by the septum alone.

Yet another object of this invention is to provide a two-part filter element of this character that can readily be held by fusing or snapping the parts together.

Still another object of this invention is to provide an improved filter element that has the characteristics of equal flow on opposite sides wtih a minimum of restriction. In this manner the efficiency or rating of the filter unit is maximized.

Still another object of this invention is to provide an improved filter element of this character that has exceptional durability. For this purpose, both the molded core and the septum structure are made of compatible material, producing no galvanic action between them. For this purpose, the septum and the core are both formed of polyethylene material or other synthetic materials having suitable characteristics.

Still another object of this invention is to provide an improved filter element assembly, utilizing a series of stacked filter elements as above characterized.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIG. 3 is an enlarged sectional view illustrating two adjacent filter elements, a part of one septum and a part of one core element being shown in elevation;

FIG. 4 is a further enlarged fragmentary sectional view taken along a plane corresponding to line 4—4 of FIG. 5, showing in detail the structure of the core and the configuration of the septum under conditions of pressure;

FIG. 5 is a plan view of companion core elements, the top element being broken away to illustrate the bottom element;

FIG. 6 is an enlarged sectional view taken along the cylindrical surface corresponding to the line 6—6 of FIG. 5; and FIGS. 7 and 8 are fragmentary sectional views each illustrating alternate forms of the present invention.

Figure 1:
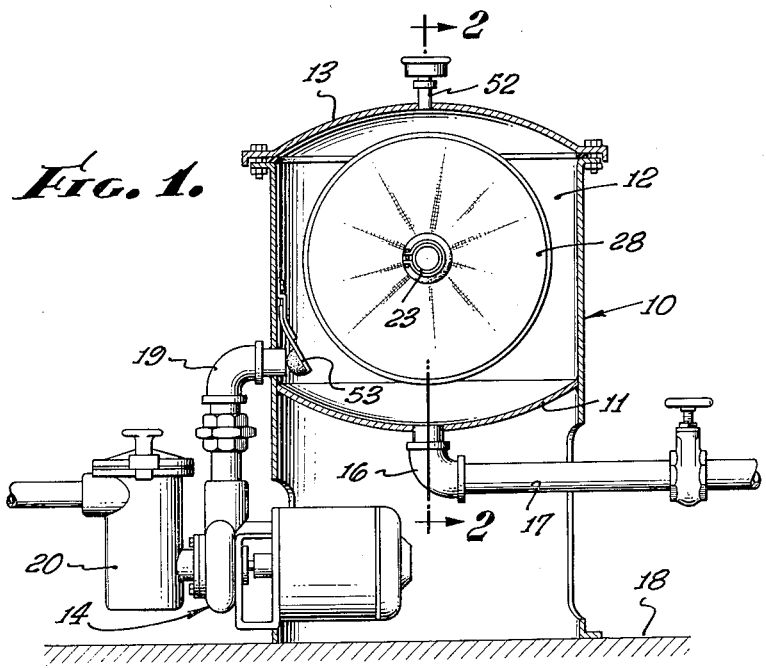
FIGURE 1 is a vertical sectional view of a filter tank in which the improved filter element assembly is embodied.

In FIG. 1 there is illustrated the tank 10 having a partition wall 11 located at about the mid-level thereof. Above the wall 11 a filter chamber 12 is formed, closed by a cover 13. Below the partition 11, various parts such as a motor for a pump 14, may conveniently be located. A waste conduit 17 receives sludge from the filter chamber 12, a fitting 16 being provided at the bottom of the partition 11. The bottom wall of the tub 10 rests upon a suitable base or support 18.

Water to be filtered is passed into the bottom of the chamber 12 via an influent conduit 19 located in the side of the tank. The pump 14 accomplishes this function. Illustrated in FIG. 1 is a strainer 20 at the inlet side of the pump 14.

Conduit 21 (FIG. 2) for outward passage of filtered water communicates with the filter chamber 12 via a transverse cylindrical fitting 22 located in the side wall of the tank 10. A horizontal collection tube 23 forms an inner extension of the effluent conduit 21. For this purpose, its right hand end, as viewed in FIG. 2, projects sealingly and detachably within the fitting 22. The left hand end 24 of the collection tube is sealed, and is mounted on a stub shaft 25. The stub shaft 25 projects sealingly through a sleeve bearing 26 mounted upon the tank wall 10 opposite the fitting 22.

Figure 2:
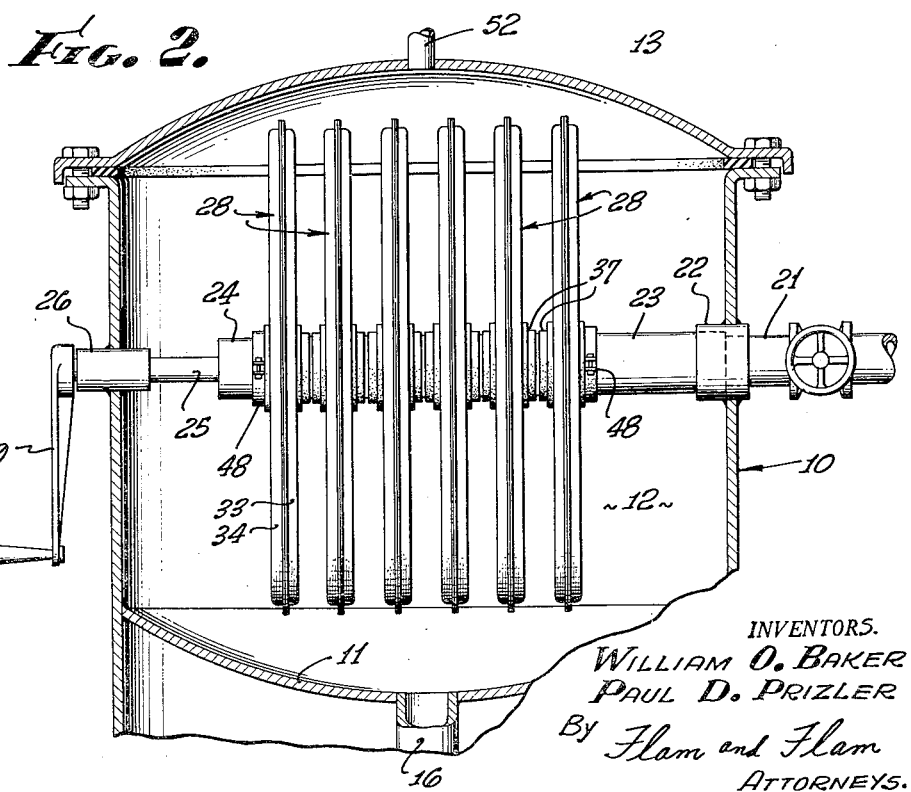
FIG. 2 is an enlarged vertical fragmentary sectional view taken along a plane indicated by line 2—2 of FIG. 1.

The collection tube 23 has a series of sets of circularly arrayed ports 27 (FIG. 3) that serve as a means for entrance of filtered water into the collection tube. Interposed between the ports 27 and the interior of the chamber 12, however, are a series of filter elements 28. In the present instance six such elements are illustrated in FIG. 2, whereby the required area for filtering is achieved. Each of the filter elements operates separately, that is, in parallel path relationship to the other filter elements and in cooperation with a single set of circularly arrayed ports 27. The filter elements are identical; a description of one will suffice as a description for all. Like parts of the filter elements are designated by like reference characters.

Each filter element 28 comprises a two part hollow core structure 29 (FIG. 5) upon which is mounted a fabric septum 30 (FIG. 3). The septum comprises two layers 33 and 34 of polyethylene fabric or equivalent material sewn or otherwise secured together at their outer peripheries, as at 30a with the two core element parts 29a and 29b between the layers.

The core parts 29a and 29b each include hubs 35 adapted to fit over a collection tube 23. Interdigitating projections 31 projecting from circular rings 32 at the bases of the hubs 35 space the hubs apart, and determine a combined end to end hub length corresponding to the center-to-center distance of the port sets 27. The hubs 35 of the filter core 29 accordingly stack in end-to-end relationship with the hubs 35 serving as accurate spacers for suitably locating the cores relative to the aperture sets 27.

The circular fabric layers 33 and 34 of the plastic septum 30 have central openings 36 corresponding in size substantially to the hubs 35. Sewn to the inner edge of each layer 33 and 34 is a neoprene or other suitable flexible resilient ring 37. The normal inner diameter of the ring 37 is less than the exterior diameter of the hub 35. Accordingly, when positioned, the resilience of the ring 37 establishes a seal about the periphery of the hub 35. The two rings 37 together thus suitably seal the inside of the septum structure 30 so that no unfiltered water can pass to the collection tube 23. The parts thus described comprise a preassembled filter element capable of placement as a unit with respect to the collection tube 23. The septum 30 by itself forms a tight enclosure or envelope that holds the core parts together.

The identical core parts 29a and 29b are shown to best advantage in FIG. 5. Integrally radiating from the base ring 32 of each part, 29b, for example, are thin integral arms 39 in this instance, eight in number. The arms 39 lie in the plane of the base ring 32. These arms 39 are connected together by correspondingly thin arcuate webs 40 located concentrically about the axis of the structure. These webs give form to the part 29b in a circular direction. Supplemental shorter radial arms 42 near the outer periphery limit the span of the webs 40 to achieve suitable strength. Arcuate openings 41 (FIG. 5) are formed between successive webs.

Supported along the upper or outer side of the arms 39 and the webs 40 are narrow upstanding vanes 43 and 44 (FIG. 5) that extend centrally along the arms and along the webs. The vanes 44 and 43 operate to support all areas of the septum layer 34 in a manner illustrated clearly in FIG. 4. The pressure of water in the chamber 12 tends to move the septum 30 inwardly, and thus the annular areas between successive vanes 44 tend to arc inwardly. The vanes 44 ensure that central areas of the annuli are suitably away from the webs 40 as well as the apertures 41. Accordingly, the septum 30 does not blind or bottom against the support and its operative area is preserved. The vanes 43 on the radiating arms elevate or hold elevated the ends of arcuate portions of the septum layers away from the radiating arms 39 to ensure flow at these areas.

The area of contact of the vanes 43 and 44 (FIG. 4) is relatively slight compared to the entire area of the septum.

The water penetrating the fabric layers 33 and 34 of the septum 30 is intended to pass inwardly of the arcuate apertures 41 and thence to the ports 27 of the collection tube 23. In order to accomplish this function a space must be provided between the radiating arms 39 of the respective juxtaposed core parts 29a and 29b. For this purpose the arms 39 are constrained to lie in planes corresponding to the base rings 32 which are separated by the pins 31. Arcuate integral spacers or ribs 45 (FIG. 5) are provided to maintain the separation. These spacers appear on the core part 29a on the left hand portion of FIG. 5 where the core part 29b is broken away. These spacers are located centrally and on the inner side of the arcuate webs 40, and extend to the sides of the radiating arms 39 on opposite sides, and short of the center lines of the arms. The spacers 45 extend only along alternate successive sets of webs located between adjacent radiating arms 39.

The spacers 45 of the respective core parts 29a and 29b are so positioned as to complement each other in circular array. In other words, the spacers 45 of the respective core parts are placed in staggered or spaced angular relationship with each other so that the spacers of each core part abut the inner surfaces of the webs 40 of the other core part, and as clearly shown in FIG. 6.

Since the angular extent of the spacers 45 is less than the angular spacing, on centers, of successive arms 39, there are necessarily interruptions in the circular array of complementary spacers 40. This means that radiating channels as indicated at 46 in FIG. 6 are formed at the areas of separation. Since the separation occurs at the arms 39, the arms 39 form two walls of such channels. The water entering between the filter core parts 29a and 29b can thus pass to the central area of the element and to the space between the hubs 35 as shown in FIG. 4, and thence to the collection tube 23 via the circular array of ports 27.

The core structure is rigid since the parts 29a and 29b back firmly one against the other. Yet the core is hollow, and aligned perforations are formed on opposite sides whereby no intermediate structure poses the possibility of blinding.

The septum 30 is adequately supported throughout its entire area. The arcuate configuration between adjacent supporting vanes 43 results actually in an increased effective area of the filter. In fact, the increase in area due to this factor may actually exceed the decrease in area caused by contact of the vanes 43 with the septum. Radiating collection channels as at 46 are provided that are of adequate volume.

There is no necessity of accurate alignment of the core parts 29a and 29b angularly with respect to each other. Should the core parts move angularly with respect to each other, and from a perfectly centered relationship, the result is simply an increase in the operative dimension of alternate radiating channels and a corresponding decrease in the operative dimension of the other alternate channels. There will be no net effect upon the flow. There is thus no necessity for accurately aligning the parts.

A number of filter elements 28 may be secured in position at the collection tube by the aid of hose type clamps 48 (FIG. 2) engaging the outer neoprene rings 37 of the end elements.

The shaft 25 and fittings 22 mount the filter elements 28 for rotation about their axis. A handle 49 at the outer end of the shaft 25 may impart such rotation. Such rotation may dislodge the material coated upon the filters, and assists the cleaning operation. To initiate cleaning or removal of the caked material, the pump 14 is shut down and the waste conduit 17 and vent 52 are opened as by valves. The influent conduit is closed automatically by a check closure 53. As water runs out, the filter elements are rapidly rotated.

All of the filter elements can be removed for replacement or repair simply by withdrawing the shaft 25 which has suitable axially separable connection with the tube 23.

In FIG. 7, the core members are shown integrated by being fused together. In FIG. 8, the core members are provided with companion snap elements or connecting means for holding them together. In both cases, reliance upon the septum to hold the core members is not required. Furthermore, the core members can be definitely aligned angularly.

The inventors claim:

1. A filter core comprising: a pair of juxtaposed core members, of unitary molded plastic material, each member having a series of arms spaced from each other, and webs extending between the arms and defining apertures therebetween for entrance of water between the core members, spacer means on alternate webs for interposing between corresponding spacer means of the other member, the length of each spacer means along the web being less than the corresponding center to center distance of the arms whereby channels are formed between the cores at the arms.

2. The combination as set forth in claim 1 together with a flexible permeable septum enclosing the elements and confining them against separation.

3. The combination as set forth in claim 1 in which said core members are fused together.

4. The combination as set forth in claim 1 in which said core members have snap connecting means for holding them together.

5. The combination as set forth in claim 1 together with a flexible permeable septum enclosing the elements and confining them against separation, the septum being made of a plastic fabric whereby no galvanic action is produced between the core and the septum, there being no other fastening means other than the septum holding the core members together.

6. A filter core comprising a pair of generally circular members of unitary molded plastic material, and placed in juxtaposed relationship, the members having hubs adapted to engage a collection tube or the like, there being a space between the hubs of the members, a series of arms radiating from the hub, webs between the arms forming apertures for entrance of water between the core members, and spacing means carried on alternate webs and spacing the arms of the respective circular members, the spacing means of the respective members being placed in staggered relationship so that the spacing means of each of the members contacts the webs of the other members; the spacing means of the members together extending in interrupted circular array about the hubs to form channels for movement of water toward the hubs.

7. The combination as set forth in claim 6 in which the apertures of the respective core members are substantially aligned.

8. The combination as set forth in claim 7, in which said spacer means comprise ribs terminating at the sides of said arms, the ribs between successive sets of adjacent arms being aligned, thereby limiting angular movement of the core members with respect to each other in opposite directions, the said channels being formed at the said arms, the channels being of substantially equal operating area when the core members are relatively centered.

9. A filter core comprising a pair of generally circular members of unitary molded plastic material, and placed in juxtaposed relationship, the members having hubs adapted to engage a collection tube or the like, there being a space between the hubs of the members, a series of arms radiating from the hub, webs between the arms forming apertures for entrance of water between the core members, and spacing means carried on alternate webs and spacing the arms of the respective circular members, the spacing means of the respective members being placed in staggered relationship so that the spacing means of each of the members contacts the webs of the other members; the spacing means of the members together extending in interrupted circular array about the hubs to form channels for movement of water toward the hubs, the webs having narrow vanes located substantially centrally thereof on that side of the core members opposite the spacing means.

10. The combination as set forth in claim 9 in which said arms also have substantially centrally located narrow vanes.

11. The combination as set forth in claim 9 together with a septum forming an enclosure for the core members, the septum comprising two layers of permeable material peripherally secured together, there being a resilient ring mounted at the inner boundary of each layer frictionally gripping the corresponding hub to establish a central seal.

References Cited in the file of this patent

UNITED STATES PATENTS

| | | |
|---|---|---|
| 1,227,983 | Vallez | May 29, 1917 |
| 2,084,753 | Watson et al. | June 22, 1937 |
| 2,263,853 | Re Qua | Nov. 25, 1941 |
| 2,964,194 | Oliver et al. | Dec. 13, 1960 |

FOREIGN PATENTS

| | | |
|---|---|---|
| 617,677 | Great Britain | Feb. 9, 1949 |
| 1,116,405 | France | Oct. 14, 1957 |
| | (2nd addition of 68,095) | |